US006816979B1

(12) United States Patent
Chen et al.

(10) Patent No.: US 6,816,979 B1
(45) Date of Patent: Nov. 9, 2004

(54) CONFIGURABLE FAST CLOCK DETECTION LOGIC WITH PROGRAMMABLE RESOLUTION

(75) Inventors: Jiann-Cheng Chen, Santa Clara, CA (US); Somnath Paul, Milpitas, CA (US); S. Babar Raza, Milpitas, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 678 days.

(21) Appl. No.: 09/775,372

(22) Filed: Feb. 1, 2001

(51) Int. Cl.$^7$ .............................. G06F 1/12; G06F 1/08; G06F 1/04
(52) U.S. Cl. .................. 713/400; 713/500; 713/600
(58) Field of Search ............................. 713/400, 500, 713/501, 502, 600

(56) References Cited

U.S. PATENT DOCUMENTS

| | | | |
|---|---|---|---|
| 3,936,604 A | 2/1976 | Pommerening | 178/69.5 R |
| 4,231,104 A | 10/1980 | St. Clair | 364/900 |
| 4,392,021 A * | 7/1983 | Slate | 380/243 |
| 4,400,817 A | 8/1983 | Sumner | 375/119 |
| 4,564,953 A | 1/1986 | Werking | 377/52 |
| 4,691,126 A * | 9/1987 | Splett et al. | 327/526 |
| 4,873,703 A | 10/1989 | Crandall et al. | 375/118 |
| 4,970,405 A * | 11/1990 | Hagiwara | 327/145 |
| 5,138,637 A | 8/1992 | Fox | 375/118 |
| 5,256,912 A | 10/1993 | Rios | 307/269 |
| 5,347,559 A | 9/1994 | Hawkins et al. | 377/54 |
| 5,811,995 A | 9/1998 | Roy et al. | 327/99 |
| 5,857,005 A | 1/1999 | Buckenmaier | 375/357 |
| 5,894,567 A | 4/1999 | Dodd et al. | 395/551 |
| 5,905,766 A | 5/1999 | Nguyen | 375/354 |
| 5,951,635 A | 9/1999 | Kamgar | 709/201 |
| 5,986,967 A * | 11/1999 | Furumochi et al. | 365/233 |
| 6,033,441 A | 3/2000 | Herbert | 369/400 |
| 6,052,152 A | 4/2000 | Malcolm, Jr. et al. | 348/537 |
| 6,075,833 A | 6/2000 | Leshay et al. | 377/16 |
| 6,134,155 A | 10/2000 | Wen | 365/189.04 |
| 6,538,489 B2 * | 3/2003 | Nakano | 327/297 |
| 6,578,118 B1 | 6/2003 | Raza et al. | 711/154 |
| 6,581,144 B1 | 6/2003 | Raza et al. | 711/166 |
| 6,625,711 B1 | 9/2003 | Raza et al. | 711/173 |
| 6,629,226 B1 | 9/2003 | Paul et al. | 711/169 |
| 6,631,455 B1 | 10/2003 | Raza et al. | 711/170 |
| 6,715,021 B1 | 3/2004 | Paul et al. | 710/310 |

FOREIGN PATENT DOCUMENTS

JP     03280922 A  * 12/1991  ............ A61B/1/04

OTHER PUBLICATIONS

IBM, Bypass Selection Mechanizm For Defective Chips, Nov. 1, 1979, vol. 22, Issue 6, pp. 2301–2302.*
S. Babar Raza et al., "Architecture for Implementing Virtual Multiqueue Fifos",. Ser. No. 09/676,704, filed Sep. 29, 2000.
S. Babar Raza et al., "Logic for Generating Multicast/Unicast Address (ES)", Ser. No. 09/676,706, filed Sep. 29, 2000.
Somnath Paul et al., "Fifo Read Interface Protocol", Serial No. 09/732,686, filed Dec. 8, 2000.
S. Babar Raza et al., "Logic for Providing Arbitration for Synchronous Dual–Port Memory", Ser. No. 09/676,169, filed Sep. 29, 2000.

* cited by examiner

*Primary Examiner*—Dennis M. Butler
*Assistant Examiner*—Suresh K Suryawanshi
(74) *Attorney, Agent, or Firm*—Christopher P. Maiorana, P.C.

(57) ABSTRACT

An apparatus comprising a first logic circuit and a second logic circuit. The first logic circuit may comprise one or more counters and may be configured to synchronize a plurality of input clock signals. The second logic circuit may be configured to detect and present a faster clock signal of the synchronized clock signals.

17 Claims, 4 Drawing Sheets

CONFIGURABLE FAST CLOCK DETECTION LOGIC WITH PROGRAMMABLE RESOLUTION

CROSS REFERENCE TO RELATED APPLICATIONS

The present application may relate to co-pending application Ser. No. 09/714,441, filed Nov. 16, 2000, Ser. No. 09/732,685, filed Dec. 8, 2000, Ser. No. 09/732,686, filed Dec. 8, 2000, Ser. No. 09/732,687, filed Dec. 8, 2000, Ser. No. 09/676,704, filed Sep. 29, 2000, Ser. No. 09/676,171, filed Sep. 29, 2000, Ser. No. 09/676,706, filed Sep. 29, 2000, Ser. No. 09/676,705, filed Sep. 29, 2000, Ser. No. 09/676,170, filed Sep. 29, 2000 and Ser. No. 09/676,169, filed Sep. 29, 2000, which are each hereby incorporated by reference in their entirety.

FIELD OF THE INVENTION

The present invention relates to a method and/or architecture for implementing a clocking scheme for single port FIFO memories generally and, more particularly, to a method and/or architecture for implementing a configurable fast clock detection logic with programmable resolution.

BACKGROUND OF THE INVENTION

First-In First-Out (FIFO) memories are often used as buffers between devices operating at different speeds. For a single port storage element, when the speeds of the interfaces are different, data flow may be interrupted. It would be desirable to implement a FIFO that detects clock speeds and automatically resolves the clock speed issues.

SUMMARY OF THE INVENTION

The present invention concerns an apparatus comprising a first logic circuit and a second logic circuit. The first logic circuit may comprise one or more counters and may be configured to synchronize a plurality of input clock signals. The second logic circuit may be configured to detect and present a faster clock signal of the synchronized clock signals.

The objects, features and advantages of the present invention include providing a method and/or architecture for a implementing a configurable fast clock detection logic with resolution that may (i) provide programmable resolution (e.g., the resolution may be increased or decreased by adjusting, for example, a maximum count value), (ii) be easy and convenient to apply to different devices that need different resolution, (iii) provide automatic detection and configuration of device blocks to a faster clock, (iv) allow the creation of FIFOs (or multi-port memories) using a single port memory, (v) provide a digital circuit that selects a faster clock from multiple asynchronous clocks, using synchronous design methodology, and/or (vi) provide a scheme that is useful in systems where asynchronous clocks are nearly equal.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
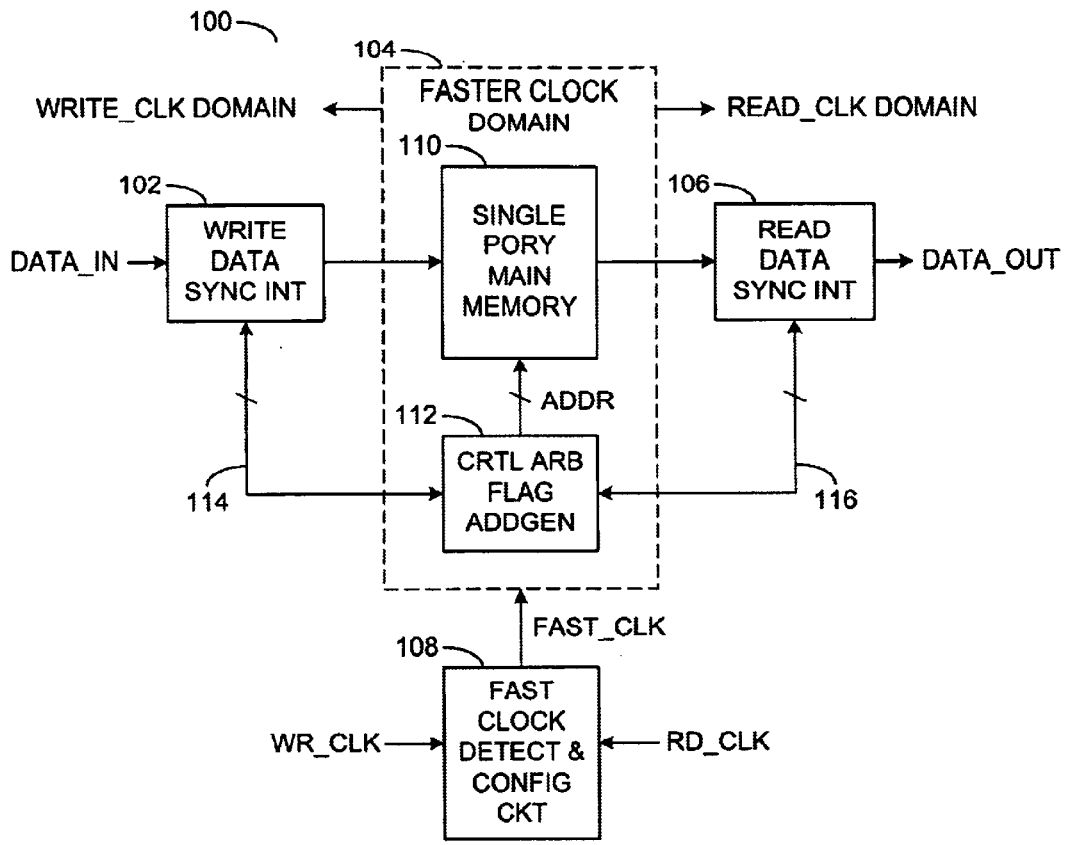
FIG. 1 is a block diagram illustrating an exemplary implementation of the present invention.

Referring to FIG. 1, a block diagram of a circuit 100 is shown illustrating a context of a preferred embodiment of the present invention. The circuit 100 generally comprises a circuit 102, a circuit 104, a circuit 106 and a circuit 108. The circuit 102 may receive an input data signal (e.g., DATA_IN). The circuit 106 may present a data output signal (e.g., DATA_OUT).

The input data signal DATA_IN may operate in a write clock domain. The output data signal DATA_OUT may operate in a read clock domain. The circuit 102 may be implemented as a write data synchronization circuit. The circuit 106 may be implemented as a read data synchronization circuit. The circuit 104 may be implemented as a clock domain selection circuit. The circuit 104 generally comprises a memory 110 and a control circuit 112. The memory 110 may be implemented as a single port main memory. The control circuit 112 may be implemented as a control arbitration flag address generator circuit. The control circuit 112 may present one or more address signals (e.g., ADDR) to the memory 110. The signals ADDR may be generated in response to one or more signals transmitted/received over a bus 114 connected to the circuit 102 and one or more signals transmitted/received over a bus 116 connected to the circuit 106. The circuit 108 may be implemented as a fast clock detect and configuration circuit. The circuit 108 may present a clock signal (e.g., FAST_CLK) by selecting either a first clock signal (e.g., WR_CLK) or a second clock signal (e.g., RD_CLK). The clock signal FAST_CLK may be implemented to clock the circuit 104.

Figure 2:
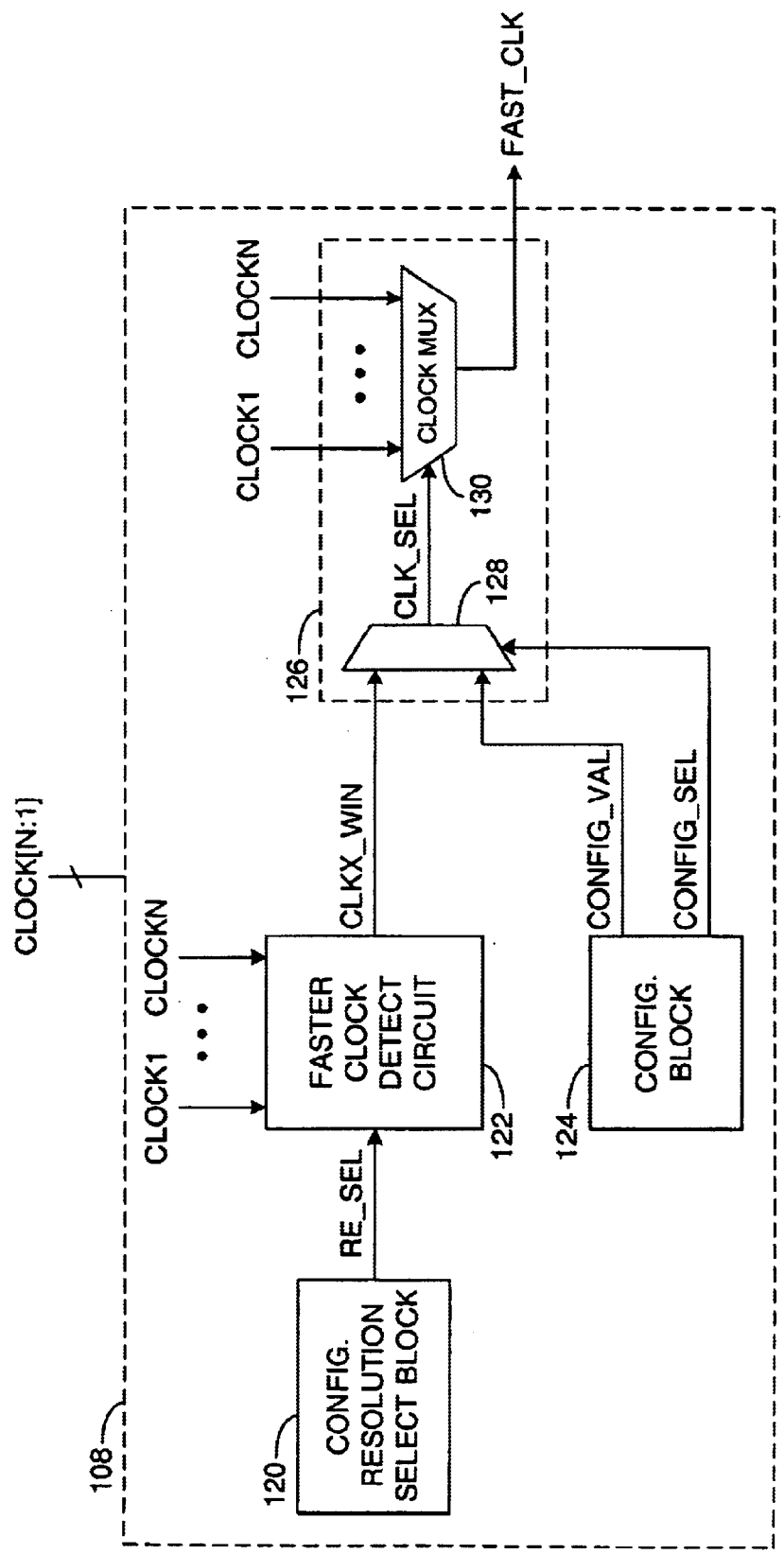
FIG. 2 is a block diagram of a preferred embodiment of the present invention.

Referring to FIG. 2, a block diagram of the circuit 108 is shown. The circuit 108 generally comprises a circuit 120, a circuit 122, a circuit 124 and a circuit 126. The circuit 120 may be implemented as a configuration resolution select block (or circuit). The circuit 122 may be implemented as a faster clock detection block (or circuit). The circuit 124 may be implemented as a configuration block (or circuit). The faster clock detection circuit 122 may be used to detect and present a fastest clock indication signal (e.g., CLKX_WIN) from a number input clock signal (e.g., CLOCK1–CLOCKN). The configuration resolution select circuit 120 may be implemented as a configurable storage element that provides a value (e.g., RE_SEL) that may determine the resolution used in the determination of the fastest clock indication signal CLKX_WIN indicating which clock is the fastest. The configuration block 124 may also be configured to present a clock indication signal (e.g., CONFIG_VAL) that may be selected in place of the fastest clock indication signal CLKX_WIN. The configuration circuit 124 may also generate a select (or control) signal (e.g., CONFIG_SEL) that provides information to a select circuit 128. The select circuit 128 may determine whether the clock indication signal CONFIG_VAL will be used or the detected value CLKX_WIN will be used as a clock select signal (e.g., CLK_SEL). A clock multiplexer 130 may then select the clock signal FAST_CLK based on the value of the signal CLK_SEL and; the input clock signals CLOCK1—CLOCKN. The fastest clock indication signal CLKX_WIN is generated after detecting which is the fastest clock. The clock indication signal CONFIG_VAL is generated from configured values, and is directly controllable. The clock select signal CONFIG_SEL indicates whether the auto-detection should be used, or the configured information should be used.

Figure 3:
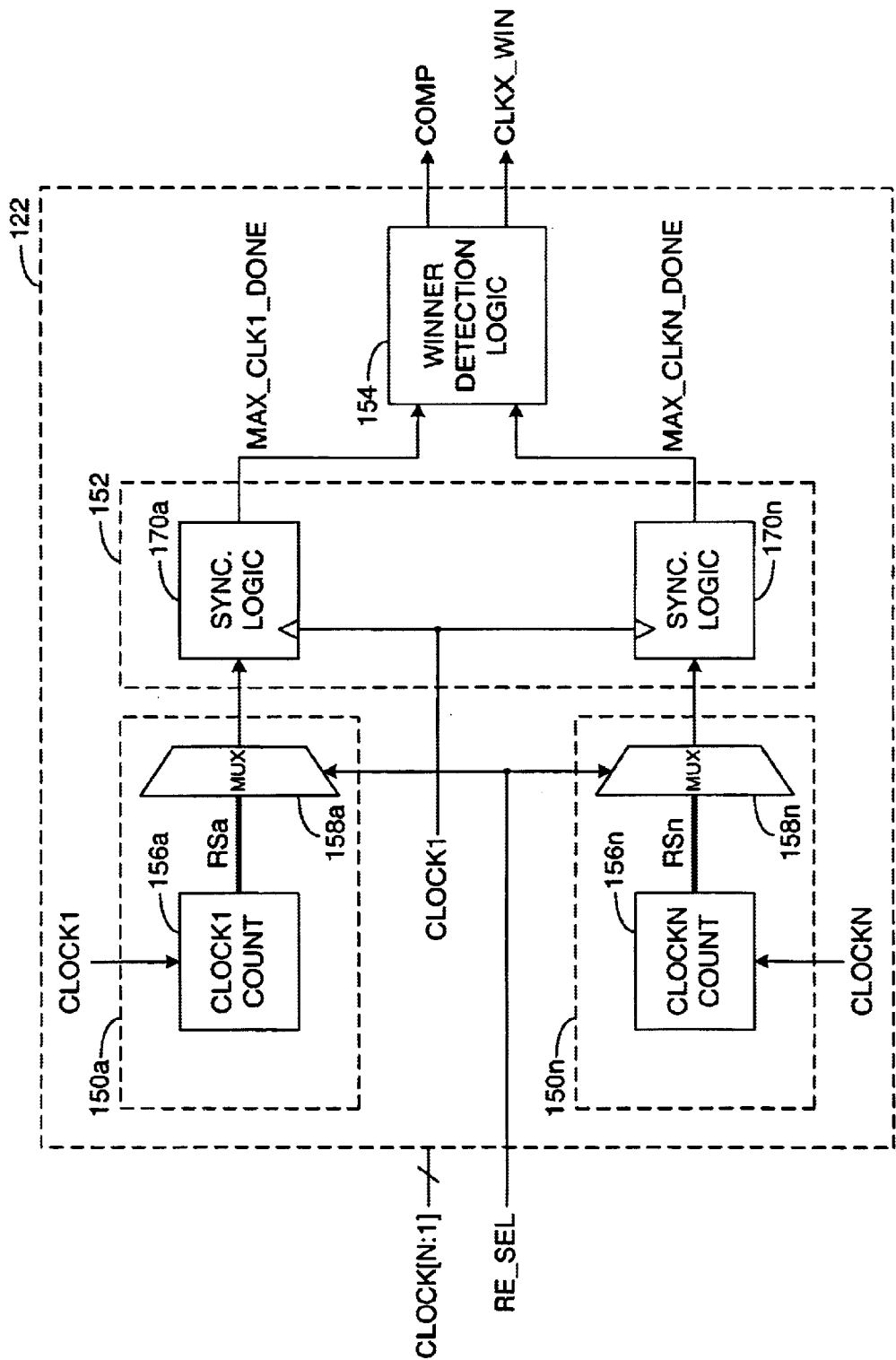
FIG. 3 is a detailed block diagram of a clock detection circuit of FIG. 2.

Referring to FIG. 3, a block diagram of the faster clock detect circuit 122 is shown. In one embodiment, there are two clock inputs (e.g., N=2). However, a variable number of integer inputs may be implemented accordingly to meet the design criteria of a particular implementation. The clock detect circuit 122 generally comprises a number of count circuits 150a–150n, a synchronization circuit 152 and a detect logic circuit 154. The circuit 150a generally comprises a count circuit 156a and a multiplexer circuit 158a. The count circuit generally receives the first clock signal (e.g., CLOCK1). The circuit 150n has similar components to the circuit 150a. The circuits 150a–150n are generally implemented as count blocks having saturation counters 156a–156n that count the number of cycles of the clock signals CLOCK1 and CLOCKN, respectively. Additionally, a power on reset (POR) input (not shown) may be presented to the counters 156a–156n to provide a reset.

The synchronization circuit 152 generally comprises a number of synchronization subcircuits 170a–170n. The synchronization logic subcircuit 170a generally presents a clock signal (e.g., MAX_CLK1_DONE). Similarly, the synchronization logic subcircuit 170n generally presents a clock signal (e.g., MAX_CLKN_DONE). The circuit 154 generally presents the signal CLKX_WIN in response to the signals received from the synchronization circuit 152. The circuit 154 may also present a signal (e.g., COMP) in response to the signals received from the synchronization circuit 152. The signal COMP indicates when a compare is complete. For example, when the signal COMP is active, the signal CLKX_WIN then determines which clock is selected.

The multiplexers 158a–158n are generally controlled by a resolution select value (e.g., RSa–Sn) to select the most significant bit (MSB) of the counter registers 156a–156n, which may be used to determine the resolution of the circuit 100. The synchronization subcircuits 170a–170n generally synchronize the outputs of the multiplexers 158a–158n to the same clock domain. The detection logic/block 154 generates the signal CLKX_WIN and the signal COMP based on the signal MAX_CLK1_DONE and the signal MAX_CLKN_DONE. The detection logic block 154 may be implemented as a winner detection logic block.

Figure 4:
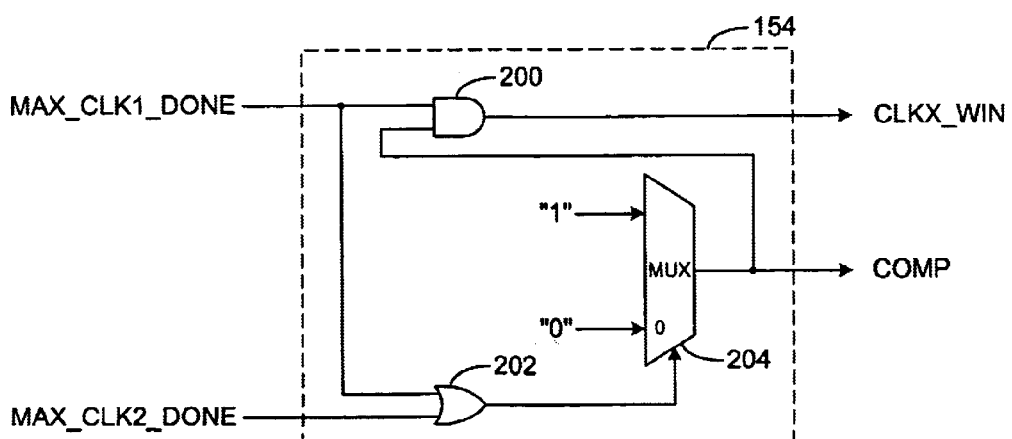
FIG. 4 is a detailed block diagram of a detection circuit of FIG. 3 illustrating a two clock system.

Referring to FIG. 4, a block diagram of the winner detection logic 154 is shown for a two clock system. The detect logic 154 generally comprises a gate 200, a gate 202, and a multiplexer 204. The gate 200 may be implemented as a AND gate. The gate 202 may be implemented as a OR gate. However, various combinations of logic for the gates 200 and 202 may be implemented accordingly to meet the design criteria of a particular implementation. The gate 200 generates the signal CLKX_WIN as a one-shot signal in response to the signal MAX_CLK1_DONE and the signal COMP. The gate 202 generally controls the multiplexer 204. The multiplexer 204 generates the signal COMP in response to a first input that receives a logic "1" and a second input that receives a logic "0".

The circuit 100 generally provides the faster clock signal FAST_CLK from multiple clock domains CLOCK[N:1]. The clock signal FAST_CLK may be fed into a system clock domain. One application for such a system is shown in the referenced application (e.g., U.S. Ser. No. 09/676, 704). The circuit 100 may be used to clock a FIFO using a single port memory from multiple clock inputs.

The resolution of the circuit 100 is configurable based on the formula (Nclkf−Nclkn)/Nclkf=Accuracy, where Nclkf is a number of faster clock counts and Nclkn is a number of clock input counts. In one embodiment (e.g., where N=2), the synchronization of both outputs of the count register 150a and the count register 150n may be used to constrain the difference of both clock counts to 1 clock count. The phase difference between the two clocks may result in an inaccuracy of 1 clock count. Therefore, the worst case difference of clock count becomes 2 counts. If both of the clock count registers 156a–156n are 11 bits, then 2 divided by 2048 is 0.097%, which we can approximate to 0.1% accuracy. Similarly, a 0.2% accuracy may be obtained if the registers are 10 bits. By picking out the MSB of the registers 156a–156n, control of the resolution may result as shown in the following TABLE 1:

TABLE 1

| Number of bit | 11 | 10 | 9 | 8 | 7 | 6 | 5 | 4 | 3 | 2 |
|---|---|---|---|---|---|---|---|---|---|---|
| Accuracy (%) | 0.1 | 0.2 | 0.4 | 0.8 | 1.6 | 3.2 | 6.4 | 12.5 | 25 | 50 |

Figure 5:
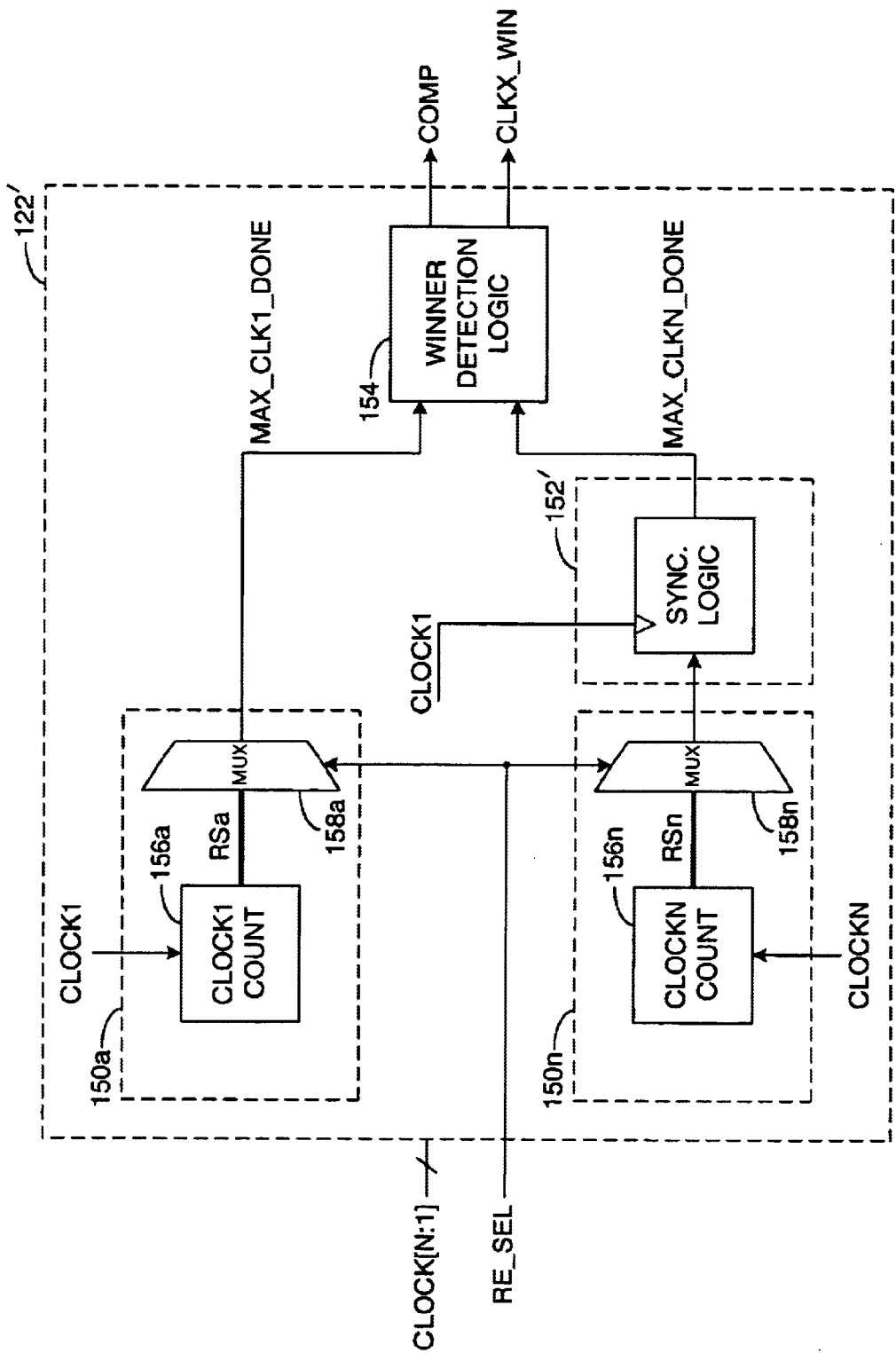
FIG. 5 a detailed block diagram of an alternate clock detection circuit of FIG. 2.

Referring to FIG. 5, an alternative embodiment of the faster clock detect circuit 122' is shown. The circuit 122' reduces the implementation of hardware by removing the synchronization logic from one clock counters (e.g., 150a). A higher priority may be assigned to the clock counter 150a–150n that does not have the synchronizing logic. Removing a portion of the synchronizing logic 152', the clock count difference increases, and hence reduces the accuracy of the circuit 100. However, certain design applications may benefit more from a reduced hardware overhead than from an increased accuracy.

The fast clock detect logic 122 may be enabled or disabled through configuration bits. Specifically, the fast clock detect logic 122 may be disabled and/or by-passed by a programmable configuration bit. Additionally, the resolution of the circuit 100 may be increased or decreased by adjusting the resolution maximum count value RE_SEL. Thus, the circuit 100 may be easily and conveniently applied to different devices that need varying resolution. The circuit 100 may provide automatic detection and configuration of FIFOs to device blocks to a faster clock. The circuit 100 may also select the faster clock from two asynchronous clocks, using synchronous design methodology. The faster clock selection of the circuit 100 may be implemented in a single port memory.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a first logic circuit comprising one or more saturation counters and configured to synchronize a plurality of input clock signals; and
   a second logic circuit configured to detect and present a faster clock signal of said synchronized clock signals.

2. The apparatus according to claim 1, wherein said first logic circuit comprises digital fast clock detection circuit.

3. The apparatus according to claim 1, wherein said second logic circuit comprises:

a fast clock detect circuit with programmable resolution configured to control a resolution of said apparatus.

4. The apparatus according to claim 3, wherein said fast clock detect circuit is enabled or disabled in response to one or more configuration bits.

5. The apparatus according to claim 4, wherein said fast clock detect logic, when disabled, is configured to be by-passed by a programmable configuration bit.

6. The apparatus according to claim 1, wherein said apparatus is configured to synchronously select said faster clock signal.

7. The apparatus according to claim 1, wherein said apparatus is fully configurable.

8. The apparatus according to claim 1, wherein said apparatus is configured to provide programmable resolution.

9. The apparatus according to claim 8, wherein said programmable resolution is configured to be increased or decreased by adjusting a count value.

10. The apparatus according to claim 1, wherein said apparatus is configured to provide automatic detection and configuration of one or more devices to said faster clock signal.

11. The apparatus according to claim 1, wherein said apparatus is configured to control one or more first-in first-out (FIFO) memories using a single port memory.

12. The apparatus according to claim 1, wherein said apparatus is configured to control one or more multiqueue memories using a single port memory.

13. The apparatus according to claim 1, wherein said apparatus is configured to control one or more multiport memories using a single port memory.

14. The apparatus according to claim 1, wherein:

said first logic circuit comprises a faster clock detect circuit configured to synchronize said plurality of input clock signals; and said second logic circuit comprises a configuration resolution circuit configured to control a resolution of said apparatus, a configuration circuit configured to control a selection of said faster clock signal and a select circuit configured to select said faster clock signal.

15. An apparatus comprising:

means for synchronizing a plurality of input clock signals with one or more counters;

means for detecting and presenting a faster clock signal of said synchronized clock signals: and means for controlling resolution in response to one or more configuration bits.

16. A method for selecting a clock signal, comprising the steps of:

(A) synchronizing a plurality of input clock signals with one or more counters;

(B) detecting and presenting the faster clock signal of said synchronized clock signals; and (C) controlling resolution in response to one or more configuration bits.

17. An apparatus comprising:

a first logic circuit comprising one or more counters and configured to synchronize a plurality of input clock signals; and a second logic circuit configured to detect and present a faster clock signal of said synchronized clock signals, wherein said second logic circuit comprises a fast clock detect circuit (i) with programmable resolution configured to control a resolution of said apparatus and (ii) enabled or disabled in response to one or more configuration bits.

* * * * *